(No Model.)
J. MARTZLOFF.
SPOOL HOLDING SPINDLE FOR WINDING SILK, &c.
No. 377,206.  Patented Jan. 31, 1888.
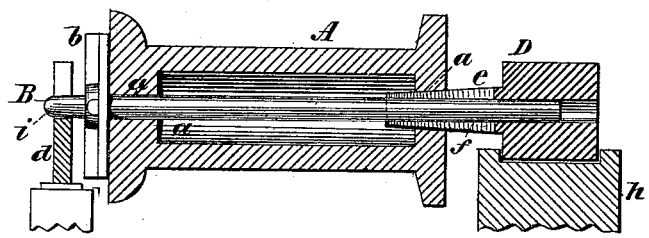
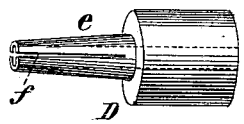
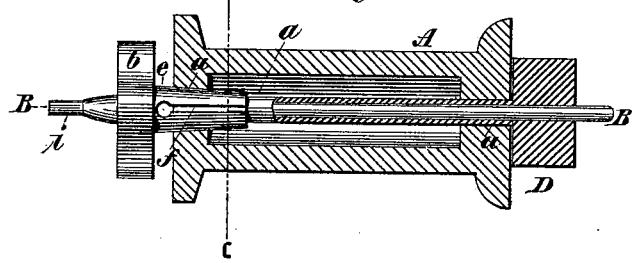
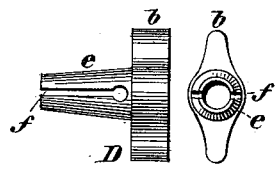 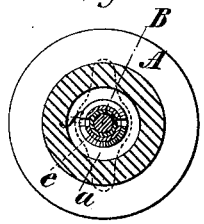
WITNESSES:
Gustave Dietrich
T. F. Bourne.
INVENTOR
John Martzloff
BY Briesen & Steele
ATTORNEYS.
N. PETERS, Photo-Lithographer, Washington, D. C.

UNITED STATES PATENT OFFICE.

JOHN MARTZLOFF, OF EASTON, PENNSYLVANIA.

SPOOL-HOLDING SPINDLE FOR WINDING SILK, &c.

SPECIFICATION forming part of Letters Patent No. 377,206, dated January 31, 1888.

Application filed July 16, 1887. Serial No. 244,477. (No model.)

*To all whom it may concern:*

Be it known that I, JOHN MARTZLOFF, of Easton, Pennsylvania, have invented a new and Improved Spool-Holding Spindle for Winding Silk, Threads, &c., of which the following is a full, clear, and exact description.

Spool-holding spindles where a screw and nut are employed to secure the spool to the spindle are objectionable on account of the time consumed by the operator to adjust them, and also because the continued changing of the spool on the spindle enlarges the hole in the spool and causes it to work loose and the threads to wind unevenly. Where projecting springs are used on the spindle the same objection of enlarging the hole in the spool is found after being in use for some time.

The object of my invention is to overcome these objections and to provide a spindle upon which the spool may be quickly and easily adjusted, and which will also hold the spool firmly in position to insure a positive and even winding of the threads upon the spool.

The invention consists in a split conical tube adapted to be placed upon the ordinary rod or spindle which passes through the spool, and to enter the aperture in the spool and fill the same tightly. As the aperture in the spool becomes enlarged under constant use, the split conical tube may be passed farther inward to always tightly fill the aperture. By this means the spool will be firmly held upon the spindle at all times.

Reference is to be had to the accompanying drawings, forming part of this specification, in which Figure 1 is a longitudinal central section of a spool, showing my improvement in position, the spindle and collar being in elevation. Fig. 2 is a perspective view of my improvement. Fig. 3 is a similar view to Fig. 1, showing a modification of my invention. Figs. 4 and 5 are side and end views, respectively, of the modification; and Fig. 6 is a cross-sectional view on line *c c*, Fig. 3.

A in the drawings represents a spool of suitable construction provided with a longitudinal aperture, *a*. B is a cylindrical spindle or rod adapted to pass through the aperture *a*, and it is provided near one end with a collar or stop, *b*. The outer end, *i*, of the spindle B, near the collar *b*, is adapted to rest in a suitable bearing, *d*.

D is a pulley or cylinder having a tapering tubular extension, *e*, which is adapted to pass into the aperture *a* in the spool A. The tapering tube *e* is split longitudinally at *f* for a suitable distance, to give a spring-tension to the same. The pulley D and tapering tube *e* are adapted to slide on the rod B.

To use my improved spindle, the spool A is first slipped on the rod B and close up against the collar *b*. The pulley D is then slipped on the other end of the rod B, and the tapering tube *e* passed into the aperture *a* and forced in until it is compressed in said aperture, the spring-tension of said tapering tube *e* causing it to bind firmly in the aperture. The end *i* of the rod B is next placed in the bearing *d*, and the pulley D is rested upon a driving-pulley, *h*, (see Fig. 1,) which is revolved and supported in any suitable manner. When so adjusted, the rod B and pulley D are rigidly and effectively united to the spool.

When it is desired to remove the spool from the spindle, it is only necessary to withdraw the tapering tube *e*, and then the rod B from the spool, which is very easily and quickly done. As the aperture *a* becomes enlarged through constant use, the tapering tube *e* may be passed farther in the aperture *a*, to always insure a perfect and tightly-fitting spindle. By using this split tapering tube *e*, the spool A is kept in a true and even position and all danger of lateral movement of the spool on its spindle is overcome. This is very important, as it is essential that the threads be evenly wound upon the spool.

In the modification shown in Figs. 3, 4, 5, and 6 the parts are reversed—that is to say, the split tapering tube *e* is attached to the collar *b*, which in this case is detached from the rod B, and pulley D is rigidly attached to the rod B. The spool is adjusted and placed in its bearings in a manner similar to that described with reference to Figs. 1 and 2. The spindle described has also the advantage that it will fit any bobbin, no matter what bore, whether hollow or solid barrel.

Having now described my invention, what I claim is—

1. The split tapering tube e, combined with the cylindrical rod B, said tube e being arranged to slide on the rod B and to hold a spool, the said rod being adapted to support said tube e near one end and the spool near the other end, as set forth.

2. The pulley D and split tapering tube e, in combination with the rod B and collar b, all arranged to operate and hold a spool substantially as herein shown and described.

JOHN MARTZLOFF.

Witnesses:
W. E. TAYLOR,
HERMAN SIMON.